Patented May 2, 1939

2,156,396

UNITED STATES PATENT OFFICE 2,156,396

EXTRUSION MOLD

Justin W. Macklin, Lakewood, Ohio, assignor, by mesne assignments, to Thermo-Plastics, Incorporated, St. Clair, Mich., a corporation of Michigan Application February 1, 1936, Serial No. 61,864

9 Claims. (Cl. 18—30)

This invention relates to an improvement in a positive injection type mold for applying a thin, uniform, veneer of thermoplastic material preferably in the nature of cellulose acetate, to the surface of a preformed article by employing separate heating and injecting chambers arranged to cooperate with each other to produce a more satisfactory article.

An object of the present invention lies in the provision of a mold having a relatively large unitary cavity which may be completely filled in a much shorter time cycle than has heretofore been accomplished.

Another object of the invention is to provide a mold having cavity walls which may be maintained at a uniform temperature throughout the operating cycle.

Another object of the invention is to provide an injection type mold having an auxiliary heating chamber connected through a transverse passage to a final heating and injecting chamber.

Another object is to provide a mold for applying thermoplastic material to a framework of an article so constructed that its surface is shaped to approximate that of the completed article, and whereby the thermoplastic material may be relatively thin.

A further object is to carry out an improved method of covering a metallic framework or insert with plastic composition by steps comprising the preparation of a rigid frame, securing the frame in a mold cavity at a uniform space from the surface of the cavity, forcing the plastic material into the mold cavity under extremely high pressures so that the material flows around the frame and fills the space intermediate the frame and the mold cavity, and is caused to weld in all directions of its surface.

Another object is to provide a mold for applying thermoplastic material to a preformed article, the mold being constructed so as to concentrate the thermal fluid at the desired locations, whereby to effect a quicker and more uniform heat transfer through the walls of the heating chamber and thru the cavity walls.

Another object is to provide a mold which includes heating and injecting chambers and separable mold blocks which may be interchangeable with the members having the injecting chambers.

These and other objects may become apparent from the consideration of the following specification taken in conjunction with the accompanying drawings, in which,—

Figure 1:
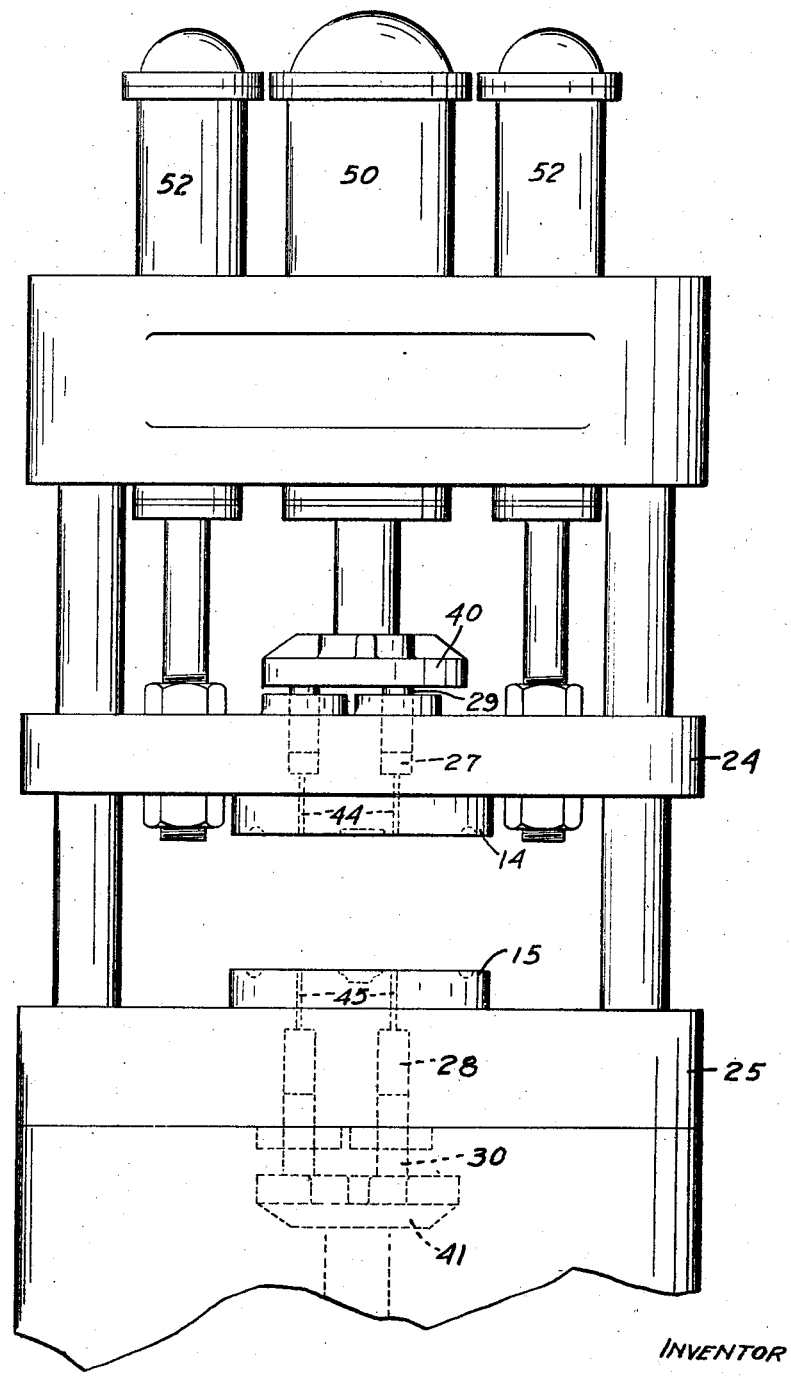
Fig. 1 is an elevation of a press with the present mold applied thereto.
Figure 2:
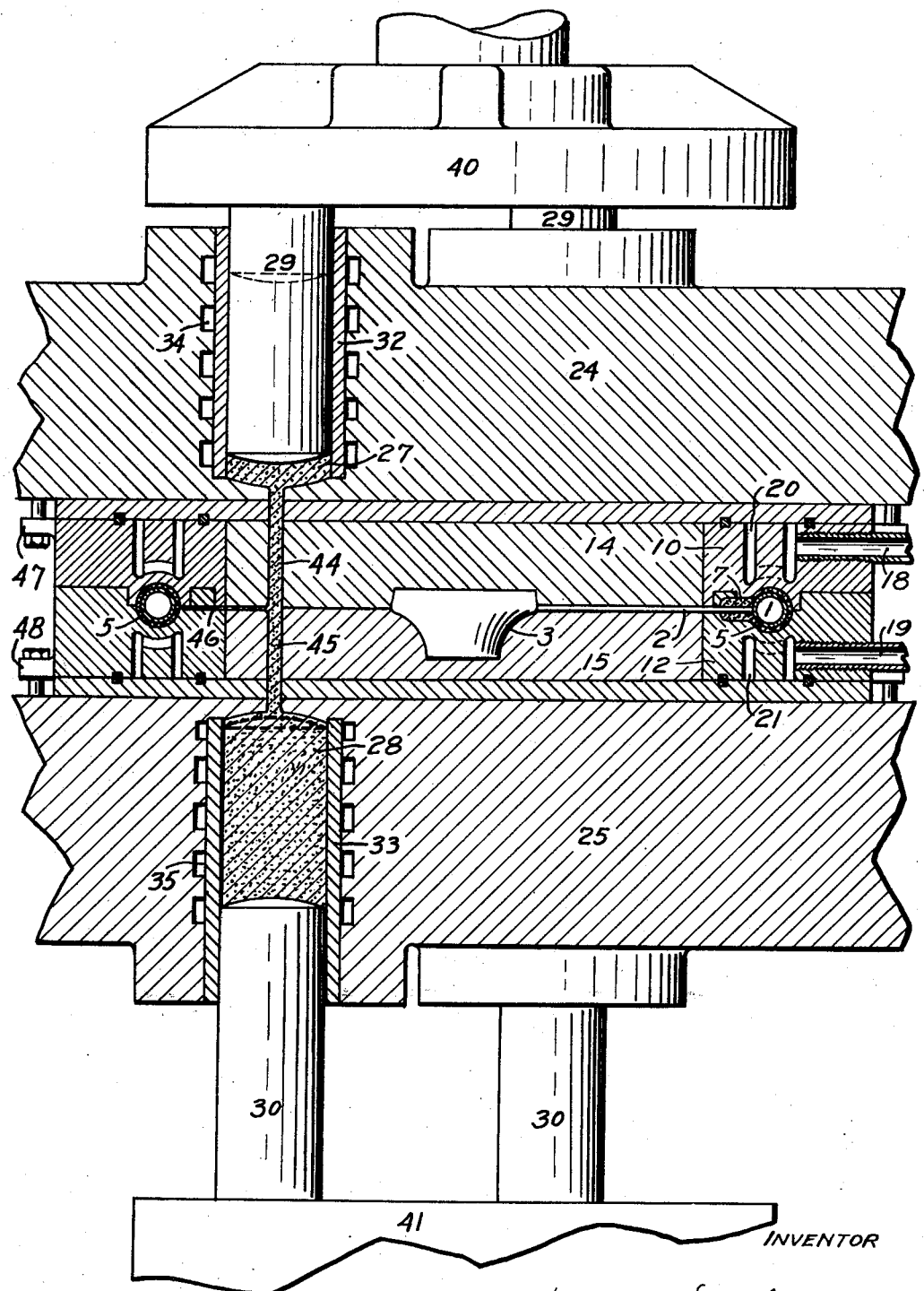
Fig. 2 is an enlarged sectional view through the mold showing the arrangement of cylinders with respect to the cavity.

In the drawings, the mold parts illustrated are for a steering wheel in which is an annular rim 1, carried on the series of sets of wire spokes 2, affixed to the rim and to a hub as at 3. This is a banjo type wheel which is illustrated in the application of Harry A. Husted, Serial No. 52,157, filed November 29, 1935.

While the drawings illustrate the mold for covering the steering wheel, it is apparent that other objects such as door handles, head light shells, hub caps, and other hardware, may be covered in exactly the same manner.

The mold members are adapted to cover the annulus evenly with thermoplastic material as at 5, and inwardly for a distance as at 7 along the spokes, the cavities being provided in hardened members 10 and 12 in the mold members 14 and 15.

Suitable heating and cooling passages, the purpose of which is hereinafter more fully described in connection with this particular operation, are indicated as comprising inlet pipes 18 and 19 which connect with passages as at 20 and 21, in the members 10 and 12 respectively. The mold members 10 and 12 are carried on platens 24 and 25 suitably mounted for relative movement in a press, which are shown provided with one or more plastic receiving and extruding cylinders 27 and 28 respectively. Into these cylinders are fitted pistons 29 and 30.

The walls of the cylinders are provided with steam jackets 32 and 33 surrounded by passages 34 and 35 respectively through which the thermal fluid is conducted. The pistons 29 and 30 are also carried on movable plunger heads or platen-like members 40 and 41 capable of movement relative to each other and to the platens 24 and 25.

Leading to the mold cavity or annulus to be coated with the thermoplastic 5 from each of the communicating aligned passages 44 and 45 which connect the cylinders 27 and 28 is a gate as at 46.

As stated, the mold members 14 and 15 are mounted on the platens 24 and 25 respectively and are preferably removably held thereto by suitable clamps and bolts as indicated at 47 and 48.

Different mold members for applying cellulose acetate to articles of hardware having a hollow or solid core, and other ornamental fixtures, may be secured to the platens 24 and 25. Thus the same platens carrying the preheating and injection cylinders may be employed for producing various articles.

In operation the upper cylinders 27 are first filled with material which is allowed to absorb just enough heat to become plastic. The members 14 and 15 are then brought tightly together and closely held under suitable pressure of say several hundred tons. The pistons 29 are next brought inwardly upon the heated material which is urged downwardly into the cylinders 28 thru the aligned passages 44 and 45. The lower cylinders 28 now being filled with plastic material, the heating therein is continued. The members 24 and 25 may now be moved apart to separate the molds 14 and 15 an amount sufficient so that the overflow or flash if any, in the gates 46 and the mold cavities may be removed.

Additional material is next introduced into the cylinders 27 and the mold members again brought tightly together and held by a pressure of several hundred tons. The lower pistons 30 are now moved upwardly while the pistons 29 are held stationary, thus forcing the material in the passages 44 and 45, now somewhat chilled and perhaps hardened, into the upper cylinders, leaving a free and unobstructed duct thru the passage 45 and gate 46 to the annulus.

Pressure on the plates 41 and injection pistons 30 is maintained until the material completely fills the cavity and surrounds the core insert. Further pressure causes the plastic to unite and weld together forming a dense unitary coating around the article. Thus the material completely envelopes the core and depends on the integral welding of the particles of material for its adhesion thereto.

This process is an improvement in the method for molding thermoplastic articles by injection, originally shown, described and claimed in a prior application Serial No. 736,484, filed July 23, 1934, and in Patent No. 2,043,584, issued June 9, 1936. In the above application and patent, the temperatures employed for rendering the cellulose acetate material plastic were given as from 215° F. to 250° F. In the present application, however, for suitable operation, temperatures sufficient to render the material plastic are employed in the primary heating cylinders 27, and this material is then heated to a considerably higher temperature in the secondary cylinders 28.

Hydraulic housings for creating pressure on the platens and plunger head 24 and 40 are indicated at 50 and 52 and they may be of any conventional design.

Having thus described my invention, what I claim is:

1. A method of molding an article of thermoplastic material comprising heating a charge of material in a preheating chamber to render the material plastic, expelling substantially the entire charge from the preheating chamber through a passage to a second heating chamber of higher temperature and then forcing the plastic material from the second heating chamber under high pressure back into the passage and out through a gate to a closed mold cavity of a temperature sufficient to solidify the material.

2. An injection type mold for producing articles of thermoplastic material comprising separable mold blocks having an article forming cavity, means controlling the temperature of the cavity, a primary heating cylinder in one mold block, a piston associated with the primary heating cylinder, a secondary heating cylinder and an associated piston in the other mold block, a passage connecting the primary and secondary heating cylinders and a gate at the parting line of the mold blocks connecting the passage with the cavity.

3. A process of molding articles of thermoplastic materials in a mold cavity which comprises heating the material in a primary heating chamber, ejecting the material therefrom and into a secondary heating chamber for charging the secondary heating chamber, then recharging and sealing the primary chamber, and then increasing the pressure in the secondary chamber while said chambers are connected to each other and to the gate of the mold cavity to inject the material into the cavity.

4. An injection type mold for producing articles of thermoplastic material comprising separable mold blocks having an article forming cavity, thermal fluid conducting passages in close proximity with the cavity, a primary heating cylinder and an associated piston in one mold block, said primary heating cylinder receiving a charge of thermoplastic material to acquire flowing characteristics, a secondary heating cylinder and an associated piston in the other mold block, a transfer passage connecting the primary and secondary heating cylinders, and a gate between the mold blocks connecting the cavity with the transfer passage.

5. An injection type mold for making articles of thermoplastic material comprising a pair of separable mold members having recesses defining a mold cavity, a primary heating chamber, a secondary heating chamber, a passage connecting said primary and secondary heating chambers, and a gate leading from the passage to the caivty.

6. An injection type mold for molding an article of thermoplastic material comprising separable mold sections having abutting faces, recesses in the faces defining a cavity, a primary heating chamber in one mold section, a secondary heating chamber in the other section, a duct connecting the primary and secondary chambers, a gate between the abutting faces connecting the duct with the cavity, means in the primary heating chamber for transferring thermoplastic material to the secondary chamber, and means in the secondary chamber for forcing the material therefrom through the duct and gate into the cavity.

7. An injection type mold for molding an article of thermoplastic material comprising separable mold sections having surfaces in the abutting faces defining a mold cavity, a primary heating chamber in one section and a secondary heating chamber in the other section, a passage connecting said chambers, a gate between the sections connecting the passage and cavity, pressure means for transferring a charge of thermoplastic material from the primary to the secondary chamber, and further pressure means for transferring the charge from the secondary chamber back through the passage to the gate and into the cavity while the chambers are in direct pressure communication with each other.

8. A mold for molding an article of thermoplastic material comprising separable mold sections having registering recesses defining a mold cavity, a primary heating cylinder and plunger, a secondary heating cylinder and piston, a passage connecting one cylinder with the other, a gate leading from the passage to the cavity, means for moving the plunger and piston concurrently in corresponding directions, and further means for moving said plunger and piston relatively in opposed directions.

9. The method of molding an article of thermoplastic material comprising the steps of heating thermoplastic material in a preheating chamber to render the material plastic, mechanically expelling heated thermoplastic material from the preheating chamber through a passage into a second heating chamber of higher temperature, whereby a portion of the material remains in the passage, then expelling the material from the second heating chamber through a gate into a mold cavity and into said passage, thereby forcing thermoplastic material in the passage back into the preheating chamber and substantially all of the material in the second heating chamber through the gate into the mold cavity of proper temperature to solidify the material.

JUSTIN W. MACKLIN.